United States Patent [19]
Bleile

[11] Patent Number: 6,044,148
[45] Date of Patent: *Mar. 28, 2000

[54] PRE-RING CALLER IDENTIFICATION APPARATUS AND METHOD AND CALL SCREENING THEREFROM

[75] Inventor: Leonard George Bleile, Calgary, Canada

[73] Assignee: Nortel Networks Corporation, Montreal, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/895,102

[22] Filed: Jul. 16, 1997

[51] Int. Cl.[7] .............................. H04M 3/02; H04M 1/00
[52] U.S. Cl. ...................... 379/375; 379/142; 379/210; 379/372; 379/373
[58] Field of Search ...................................... 379/142, 201, 379/372, 373, 374, 375, 376, 377, 382, 215, 93.35, 106.05, 106.09, 210, 211, 212

[56] References Cited

U.S. PATENT DOCUMENTS

| | | | |
|---|---|---|---|
| 4,551,581 | 11/1985 | Doughty | 379/201 |
| 5,228,080 | 7/1993 | Nutter et al. | 379/373 |
| 5,263,084 | 11/1993 | Chaput et al. | 379/215 |
| 5,287,401 | 2/1994 | Lin | 379/215 |
| 5,351,289 | 9/1994 | Logsdon et al. | 379/142 |
| 5,377,260 | 12/1994 | Long | 379/142 |
| 5,388,150 | 2/1995 | Schneyer et al. | 379/142 |
| 5,544,235 | 8/1996 | Ardon | 379/177 |
| 5,553,125 | 9/1996 | Martensson | 379/142 |
| 5,579,381 | 11/1996 | Courville et al. | 379/106.05 |
| 5,649,002 | 7/1997 | Brady et al. | 379/215 |
| 5,651,053 | 7/1997 | Mitchell | 379/207 |
| 5,661,788 | 8/1997 | Chin | 379/142 |
| 5,724,408 | 3/1998 | Morganstein | 379/142 |
| 5,737,400 | 4/1998 | Bagchi et al. | 379/142 |
| 5,771,281 | 6/1998 | Batten, Jr. | 379/142 |
| 5,802,166 | 9/1998 | Garcia et al. | 379/201 |
| 5,812,648 | 9/1998 | Wanner | 379/142 |
| 5,850,435 | 12/1998 | Devillier | 379/142 |
| 5,875,241 | 2/1999 | Chang et al. | 379/142 |

FOREIGN PATENT DOCUMENTS

| | | | |
|---|---|---|---|
| 0 559 047 A1 | 9/1993 | European Pat. Off. | H04M 1/66 |
| 0 653 869 A1 | 5/1995 | European Pat. Off. | H04M 9/00 |
| 0 674 419 A2 | 9/1995 | European Pat. Off. | H04M 3/50 |

OTHER PUBLICATIONS

Patent Abstracts of Japan from the European Patent Office. Publication No. 04004647. Publication date Jan. 9, 1992. Application No. 02108488, application date Apr. 4, 1990. Applicant: Mitsubishi Electric Corp. Title: ISDN Terminal Equipment.

IBM Technical Disclosure Bulletin vol. 38, No. 7, Jul. 1995, Title: "Speech–Activated Telephone Answering System" p. 577. Published in New York, United States.

*Primary Examiner*—Scott Wolinsky

[57] ABSTRACT

A telephone apparatus for screening calls on the basis of messages containing message data, the messages being transmitted by a central office before a first ring burst is transmitted by the central office. The apparatus includes a message receiver, a decoder, a ringer and a ringer controller. The message receiver is in communication with the central office line and is operable to receive a message while the telephone is on-hook. The decoder decodes the message to extract the message data from the message. The ringer is operable to sound an audible alarm when a telephone call is received and the ringer controller prevents the ringer from sounding in response to the first ring burst, when the message data satisfies a pre-defined condition.

15 Claims, 3 Drawing Sheets

PRE-RING CALLER IDENTIFICATION APPARATUS AND METHOD AND CALL SCREENING THEREFROM

BACKGROUND OF THE INVENTION

This invention relates to the use of calling line identification information messages to control a ringer in a telephone.

In conventional subscriber telephone equipment, calling line identification information is transmitted to the subscriber after a second ring burst. Consequently, if the subscriber desires to know who is calling, the subscriber must not answer the call until after a first ring burst. Even if the subscriber has blocked certain calls based on calling line ID, the subscriber must still hear the first ring. This can be annoying to the subscriber. The present invention addresses this problem.

SUMMARY OF THE INVENTION

In accordance with one aspect of the invention, there is provided a telephone apparatus for screening calls on the basis of messages containing message data, the messages being transmitted by a central office before a first ring burst is transmitted by the central office. The apparatus includes a message receiver, a decoder, a ringer and a ringer controller. The message receiver is in communication with the central office line and is operable to receive a message while the telephone is on-hook. The decoder decodes the message to extract the message data from the message. The ringer is operable to sound an audible alarm when a telephone call is received and the ringer controller prevents the ringer from sounding in response to the first ring burst, when the message data satisfies a pre-defined condition.

Preferably, the apparatus includes a display for displaying a representation of the message data.

Preferably, the pre-defined condition includes a match between the message data and pre-defined data.

Preferably, the apparatus includes a block out list of telephone numbers from which calls are not to be accepted, and preferably, the pre-defined data includes the telephone numbers in the block-out list.

The message data may include a name of a caller and the pre-defined data may include the name of a person from whom a user of the apparatus does not want to receive a telephone call.

The message data may include a telephone number of a caller and the pre-defined data may include the telephone number of a person from whom a user of the apparatus does not want to receive a telephone call.

Preferably, when the message data matches the pre-defined data, the ringer is prevented from responding to ring burst signals received from the central office.

Preferably, the message receiver and the decoder include an FSK receiver for receiving FSK signals from the central office, when the telephone is on-hook.

Preferably, the apparatus includes an on-hook detector, for detecting whether or not the telephone is on-hook.

In accordance with another aspect of the invention, there is provided a method of screening telephone calls in response to messages transmitted to a telephone by a central office before a first ring burst is transmitted to the telephone, the messages including caller identification information, the method comprising the steps of:

a) receiving a message receiver in communication with said central office line, while said telephone is on-hook; and b) decoding said message to extract said message data from said message; and c) preventing a ringer controlled by said telephone, from sounding in response to said first ring burst, when said message data matches a pre-defined condition.

In accordance with another aspect of the invention, there is provided a method of providing pre-ring identification of a calling party on a subscriber line, the method comprising the steps of:

a) transmitting on said subscriber line a pre-ring message including the identification of the calling party; and b) transmitting on said subscriber line a first ring burst, after the pre-ring message has been transmitted.

Preferably, the method includes the steps of transmitting a first ring burst, providing a pre-ring silence period before transmitting the first ring burst, transmitting a pre-ring channel seizure burst and transmitting a mark burst after the pre-ring channel seizure burst.

BRIEF DESCRIPTION OF THE DRAWINGS

In drawings which illustrate embodiments of the invention.

DETAILED DESCRIPTION

Figure 1:
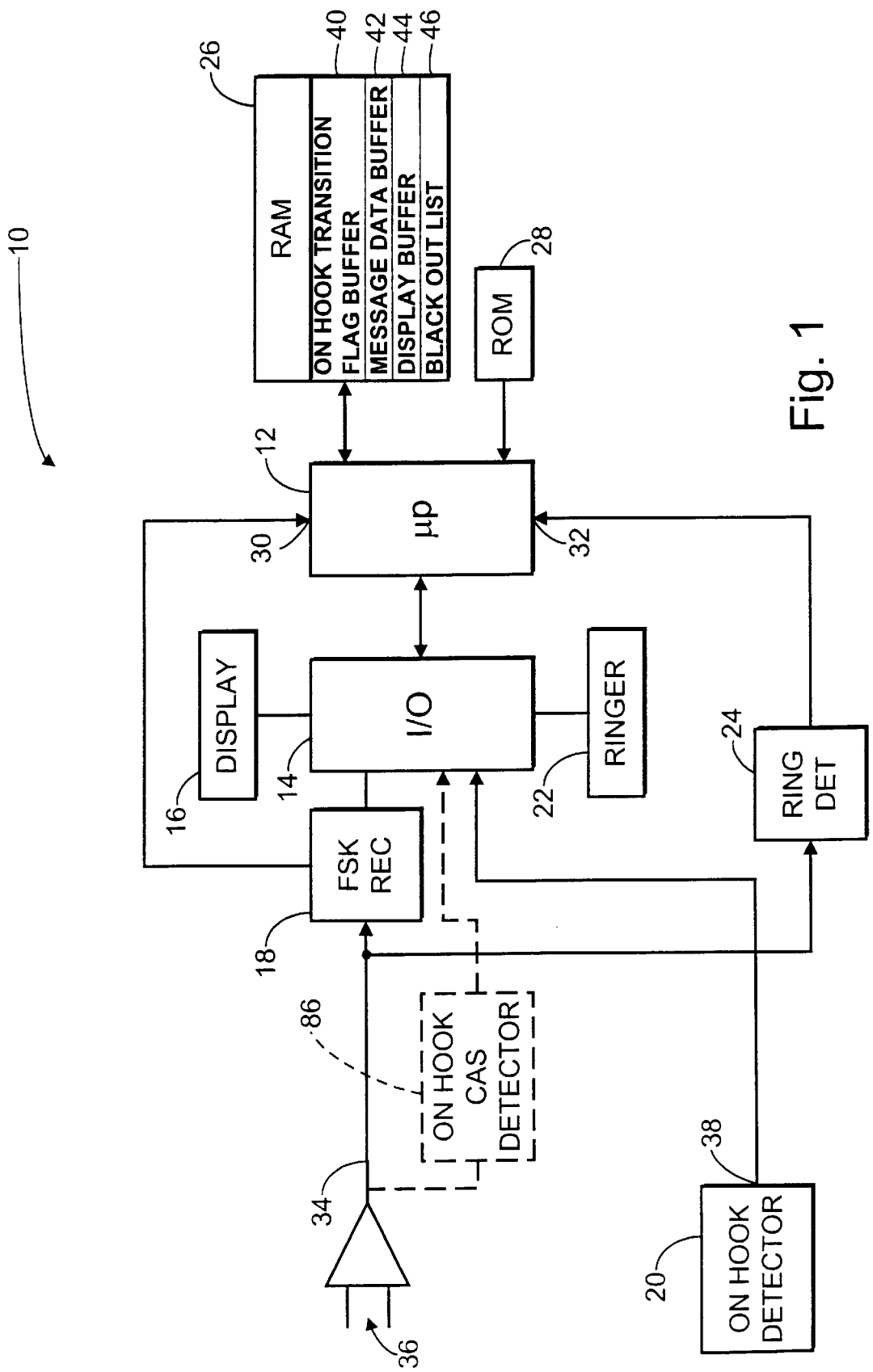
FIG. 1 is a block diagram of an apparatus according to a first embodiment of the invention.

Referring to FIG. 1, an apparatus according to a first embodiment of the invention is shown generally at 10. The apparatus is part of a telephone, not shown, and includes a microprocessor circuit including a microprocessor 12, an input/output (I/O) port 14, a liquid crystal display (LCD) 16, a frequency shift keying (FSK) receiver 18, an on-hook detector 20, a ringer 22 for sounding an audible alarm when a telephone call is received, a ring detector 24 and random access memory (RAM) 26 and read only memory (ROM) 28. The apparatus acts to screen messages containing message data, where the messages are transmitted by a central office before a first ring burst is received at the telephone.

In this embodiment, the microprocessor is a Motorola MC68HC705LN56 and has conventional address and data busses which enable the microprocessor 12 to communicate with the I/O port and the microprocessor RAM and ROM 26 and 28. The microprocessor 12 also has first and second interrupt inputs 30 and 32 for receiving a message signal from the FSK receiver 18 and for receiving a ring detect signal from the ring detector 24 respectively. The FSK receiver 18 is operable to provide to the microprocessor 12 via the I/O port 14 digital message data representing FSK messages it receives from a receive signal path 34 in the telephone. In this embodiment, the FSK receiver receives signals from the receive signal path 34 independently of whether or not the telephone is on-hook or off-hook. In other words, the FSK receiver 18 is always in communication with a central office line 36 connecting the telephone to a central office, independently of whether or not the telephone is on-hook or off-hook. The FSK receiver thus acts as a message receiver in communication with the central office line, the message receiver receiving a message while the telephone is on-hook or off-hook. In addition, the FSK receiver acts as a decoder for decoding the message to extract message data from the FSK message.

The ring detector 24 is also connected to the receive signal path to receive ring signals therefrom, again, independently of whether or not the telephone is on-hook or off-hook.

The on-hook detector 20 includes conventional circuitry for determining whether or not the telephone is on-hook or off-hook, such circuitry having an output 38 operable to provide to the microprocessor 12, via the I/O port 14, an on-hook signal which is rendered active when the telephone is on-hook.

The ROM 28 is programmed with codes representing instructions which direct the microprocessor 12 to perform various functions including functions implementing a message response algorithm.

The message response algorithm includes instructions which configure the RAM 26 to include an on-hook transition flag buffer 40, a message data buffer 42, a display buffer 44 and a block out list buffer 46. The on-hook transition flag buffer 40 is used to store a code indicating whether or not there has been a transition from the off-hook state to the on-hook state at the telephone as determined by reading the I/O port 14 for the status of the on-hook signal. Thus the on-hook transition flag buffer is used to indicate whether the telephone has just gone on-hook.

The message data buffer 42 is used to store message data contained in message signals received from the receive signal path 34, as detected by the FSK receiver 18.

The display buffer 44 is used to hold data to be displayed on the LCD 16.

The block out list buffer 46 is used to store a list of telephone numbers from which telephone calls are not to be received. The user may program telephone numbers into this list by entering such numbers on a user input device such as a keypad (not shown) or by receiving and storing telephone numbers from calling line identification (CLID) information received from the central office. In addition, the telephone number of a current caller may be added to the list in a manner similar to that in which telephone numbers are added to a personal directory in a telephone. The telephone numbers act as pre-defined data in the block out list.

Figure 2A:
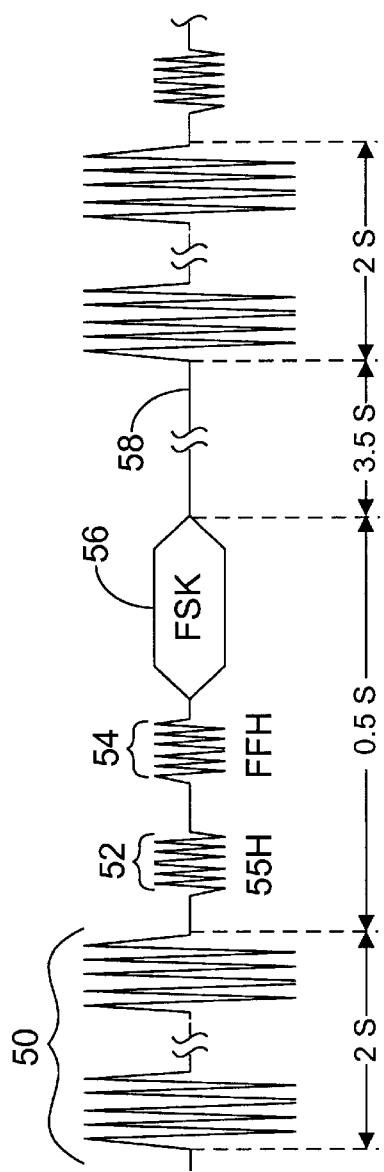
FIG. 2A is a timing diagram of signals received on a central office line according the prior art.

Referring to FIG. 2A, it will be appreciated that with conventional telephone technology, to signal a subscriber telephone, the central office transmits an approximately 2-second ring burst 50 on the central office line. If calling line identification information is to be sent to the subscriber telephone, the central office follows the ring burst 50 with a channel seizure burst 52 and a mark burst 54, followed by an FSK message 56 encoded in an FSK format, followed by a silence period 58. The time taken for the channel seizure burst 52, the mark burst 54 and the FSK message 56 is about 0.5 seconds, while the silence period is about 3.5 seconds. Following the silence period, the above pattern is repeated, without the FSK message 56.

Figure 2B:
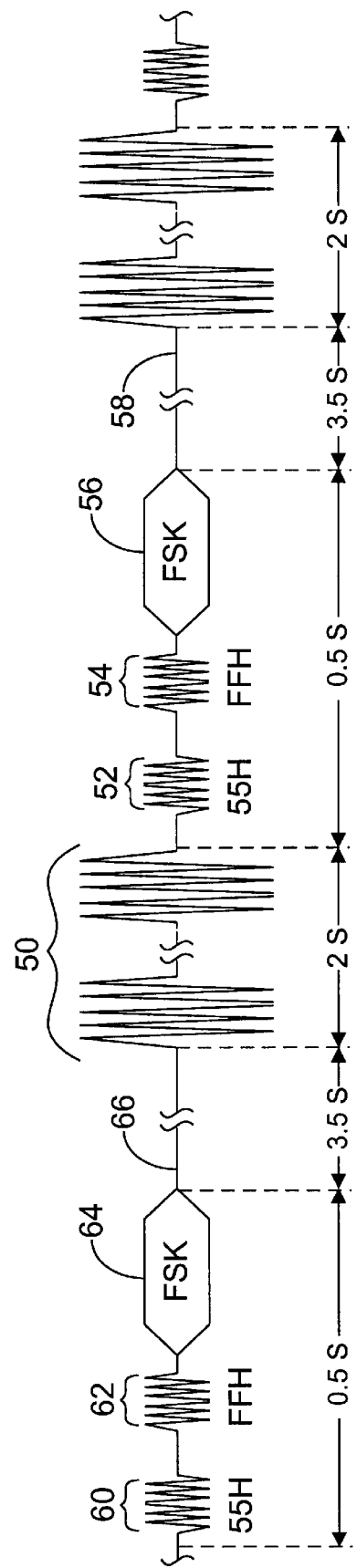
FIG. 2B is a timing diagram of signals received on the central office line, according to the first embodiment of the invention.

Referring to FIG 2B, to use the present invention, the central office transmits a pre-ring channel seizure burst 60, the mark burst 62 and pre-ring FSK message 64 followed by a pre-ring silence period 66, before the first ring burst 50 of the signalling sequence shown in FIG 2A is transmitted. Using this signalling format, the message response algorithm directs the microprocessor to respond as described below.

Operation

Figure 3:
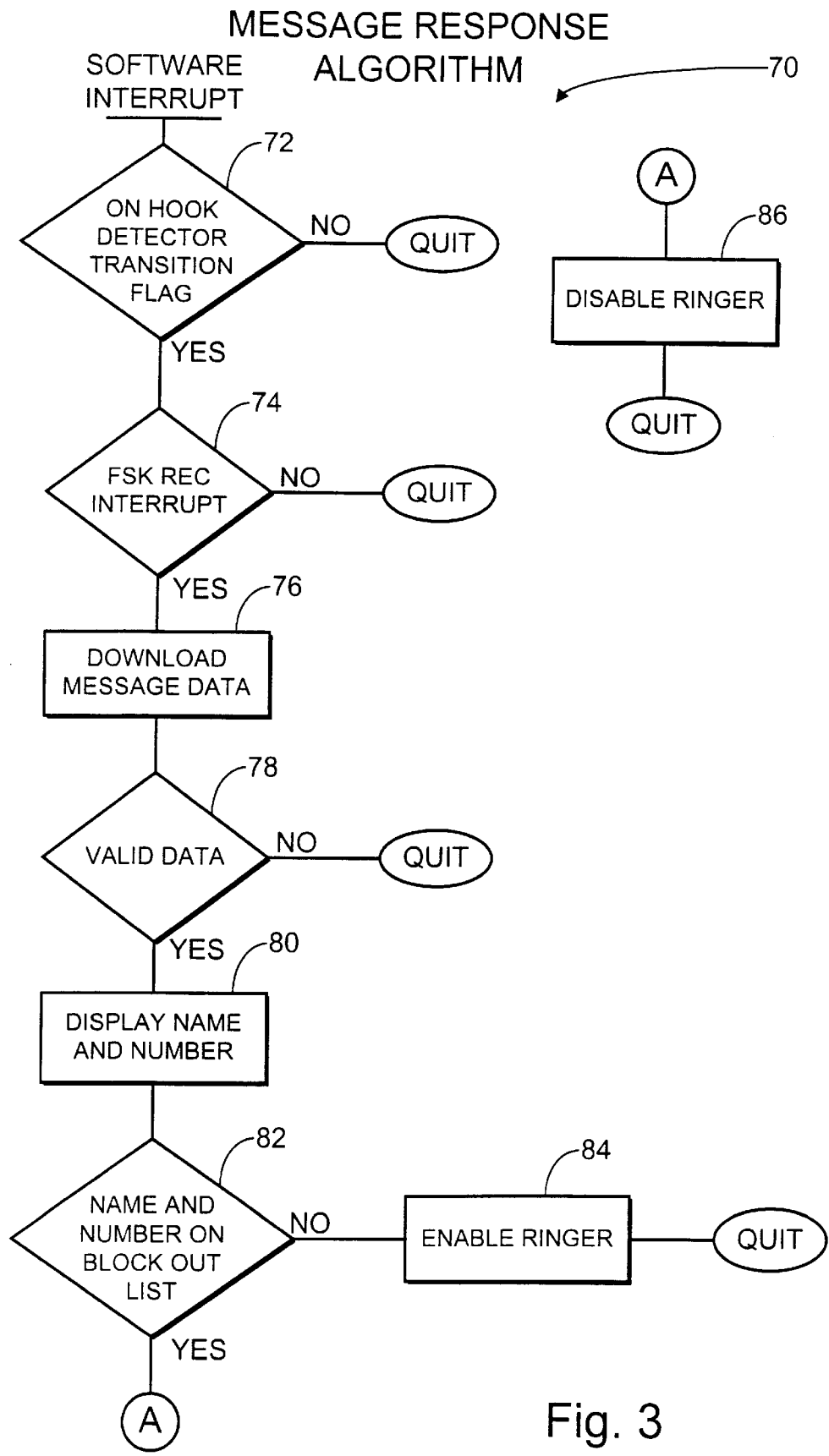
FIG. 3 is a flowchart of a message response algorithm according to the first embodiment of the invention.

Referring to FIG. 3, the message response algorithm is shown generally at 70. It will be appreciated that the microprocessor 12 shown in FIG. 1, runs other conventional programs stored in ROM 28, for performing various other functions of a conventional telephone. One of such programs is a main algorithm (not shown) which calls various other algorithms associated with specific functionality. The message response algorithm is also called at periodic intervals, in this embodiment, about 4 seconds.

Referring to FIGS. 1 and 3, the message response algorithm begins with block 72 which directs the microprocessor 12 to read the contents of the on-hook transition flag buffer 40 to determine whether or not the telephone has been taken from an off-hook state to an on-hook state. If the telephone has not undergone this transition, the user is considered to be using the telephone and use of the invention is unnecessary. However, if the user has placed the telephone on-hook, block 74 of the message response algorithm directs the microprocessor 12 to determine the status of the FSK receive interrupt input 30. If the status of this input indicates that an interrupt has not been received, it is assumed that no FSK data has been received and the message response algorithm is ended.

If the FSK receive interrupt input 30 indicates that an interrupt has been received, block 76 directs the microprocessor 12 to download message data from the FSK receiver 18 into the message data buffer 42 in RAM 26. Block 78 then directs the microprocessor 12 to calculate a cyclic redundancy check (CRC) value and compare it with a corresponding value transmitted with the message. If the CRC values are not equal, the message is assumed to be invalid and the message response algorithm is ended. However, if the CRC values are equal, the message is assumed to be valid and block 80 directs the microprocessor 12 to load a data portion of the FSK message data into the display buffer 44. A separate, conventional display routine (not shown) causes the contents of the display buffer to be displayed by the LCD 16. The LCD thus acts as a display in communication with the processor, for displaying a representation of the message data.

Block 82 then directs the microprocessor 12 to compare a telephone number portion of the message data with the telephone numbers stored in the block out list buffer 46. If none is equal, block 84 directs the microprocessor to enable the ringer and end the message response algorithm. Subsequent ring bursts received on the central office line will then be sounded by the ringer 22.

If the telephone number portion of the message data matches any of the telephone numbers stored in the block out list buffer 46, block 84 directs the microprocessor 12 to disable the ringer 22 and end the message response algorithm. Subsequent ring bursts, including the first ring burst, received on the central office line will then not be sounded by the ringer 22.

The microprocessor thus acts as a ringer controller for preventing the ringer from sounding in response to the first ring burst when the message data matches a pre-defined condition. The microprocessor also prevents the ringer from sounding in response to subsequent ring bursts occurring after the first ring burst, until the calling party terminates the call. It will also be appreciated that processor is programmed to enable the display to display a representation of the message data, while preventing the ringer from sounding when the message data satisfies a pre-defined condition. The pre-defined condition includes a match between the message data and pre-defined data, where the pre-defined data includes telephone numbers in the block out list.

By receiving an FSK message prior to the first ring burst, the ringer 22 can be disabled where the FSK data matches an entry in a block out list. Thus, the user need not hear the first ring burst or any ring bursts if the calling telephone number is on the block out list. Alternatively, the block out list may include names of callers from whom calls are not to be received and the message data includes the name of the caller.

It is also possible to use the present invention to receive and display data, without enabling the ringer to sound, thereby providing a way of sending advertising or other information to a subscriber's telephone. In this scenario, the message may include an identification code to which the microprocessor responds by disabling the ringer and displaying a data portion of the message on the display. To sound the ringer for conventional telephone operation, a ring message may be transmitted prior to the first ring burst to inform the telephone that a ring cadence is about to be transmitted.

In an alternative embodiment, the pre-ring channel seizure burst 60 may be replaced with a pre-ring CAS tone, in which case, the telephone would include an on-hook CAS detector circuit 86 connected to the I/O port 14 as shown in FIG. 1, for providing an active signal in response to receipt of a pre-ring CAS tone. The microprocessor would include a routine which directs the microprocessor to the message response algorithm shown in FIG. 3, in response to successful receipt of a pre-ring CAS tone.

The invention enables a user to be informed of the identity of a caller before the telephone begins to ring. It also enables the telephone to block out telephone calls from particular telephone stations, at the discretion of the user. Thus, the user can be informed of only those calls which he/she has authorized for reception and the user will not be bothered by telephone ringing associated with calls from unauthorized parties.

While specific embodiments of the invention have been described and illustrated, such embodiments should be considered illustrative of the invention only and not as limiting the invention as construed in accordance with the accompanying claims.

What is claimed is:

1. A method of screening telephone calls in response to a message including Calling Line Identification (CLID) information transmitted to a telephone by a telephone call signalling device before a first ring burst of a telephone call is transmitted to said telephone by said telephone call signalling device, the method comprising:
   a) receiving said message at said telephone before said first ring burst is received at said telephone; and
   b) preventing a ringer at said telephone from sounding in response to receipt of said first ring burst at said telephone, when said CLID information satisfies a condition.

2. The method claimed in claim 1 further comprising displaying a representation of said CLID information.

3. The method claimed in claim 1 further comprising preventing said ringer from responding to ring burst signals received from the telephone call signalling device when said CLID information matches pre-defined data.

4. A telephone for screening calls on the basis of message containing Calling Line Identification (CLID) information, transmitted by a telephone call signalling device before a first ring burst of a telephone call is transmitted by said telephone call signalling device, the telephone comprising:
   a) a message receiver operable to receive said message while said telephone is on-hook and before said first ring burst of said telephone call is received at said telephone;
   b) a ringer for sounding an audible alarm in response to ring bursts produced by said telephone call signalling device when a telephone call is received; and
   c) a ringer controller for preventing said ringer from sounding in response to said ring bursts received at said telephone, when it is determined that said CLID information satisfies a pre-defined condition before said first ring burst is received at said telephone.

5. The telephone as claimed in claim 4 further comprising a display for displaying a representation of said CLID information.

6. The telephone as claimed in claim 4 wherein said pre-defined condition includes a match between the CLID information and pre-defined data.

7. The telephone as claimed in claim 6 further comprising a block-out list of telephone numbers from which calls are not to be accepted, and wherein said pre-defined data includes said telephone numbers in said block-out list.

8. The telephone as claimed in claim 6 wherein said CLID information includes a name of a caller and said predefined data includes the name of a caller from whom a user of the telephone does not want to receive a telephone call.

9. The telephone as claimed in claim 6 wherein said CLID information includes a telephone number of a caller and said pre-defined data includes the telephone number of a caller from whom a user of the telephone does not want to receive a telephone call.

10. The telephone as claimed in claim 6 wherein said ringer controller prevents said ringer from responding to ring burst signals received from the telephone call signalling device when the CLID information matches the pre-defined data.

11. The telephone as claimed in claim 4 wherein said message receiver includes a frequency shift keying (FSK) receiver for receiving FSK signals from the telephone call signalling device, whether or not said telephone is on-hook or off-hook.

12. The telephone as claimed in claim 4 wherein said message receiver includes a frequency shift keying (FSK) receiver for receiving FSK signals from the telephone call signalling device, when said telephone is on-hook.

13. The telephone as claimed in claim 12 further including an on-hook detector, for detecting whether or not said telephone is on-hook.

14. A method of screening telephone calls in response to Calling Line Identification information (CLID) received before a first ring burst of a telephone call, the method comprising:
   a) receiving a message including CLID information at a telephone prior to receiving a first ring burst of a telephone call at said telephone;
   b) determining whether or not said CLID information satisfies a condition before said first ring burst is received at said telephone; and
   c) controlling a ringer at said telephone to enable said ringer to respond to ring bursts associated with said call when said CLID information does not satisfy said condition and to prevent said ringer from sounding in response to said ring bursts when said CLID information satisfies said condition.

15. A telephone operable to screen telephone calls in response to Calling Line Identification (CLID) information received before a first ring burst of a telephone call, the telephone comprising:
   a) a receiver operable to receive a message including CLID information prior to receiving a first ring burst of a telephone call at said telephone;

b) a ringer responsive to ring bursts transmitted to said telephone from a telephone call signaling device, for notifying a user of the telephone of an incoming telephone call;
c) a processor which determines whether or not said CLID information satisfies a condition before said first ring burst is received at said telephone; and
d) a ringer controller cooperating with said processor to enable said ringer to respond to said ring bursts when said CLID information does not satisfy said condition and to prevent said ringer from sounding in response to said CLID information satisfying said condition.

* * * * *